March 16, 1926.  
E. NESTLER  
DRY HEAT CURING CABINET  
Filed Dec. 4, 1924
1,577,291
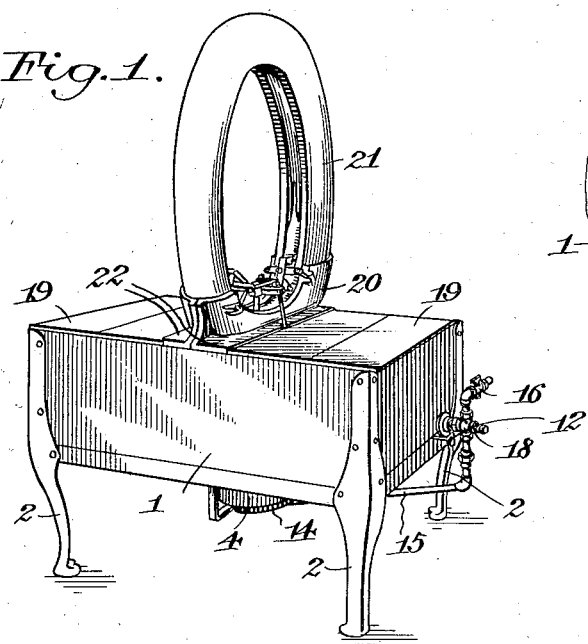
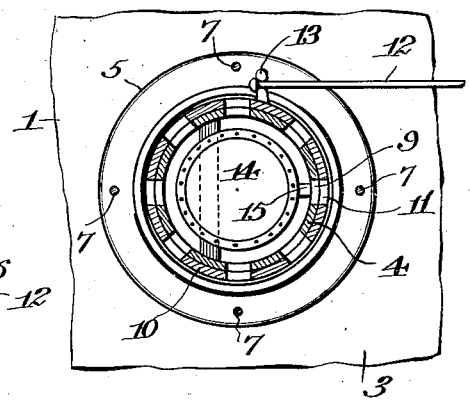
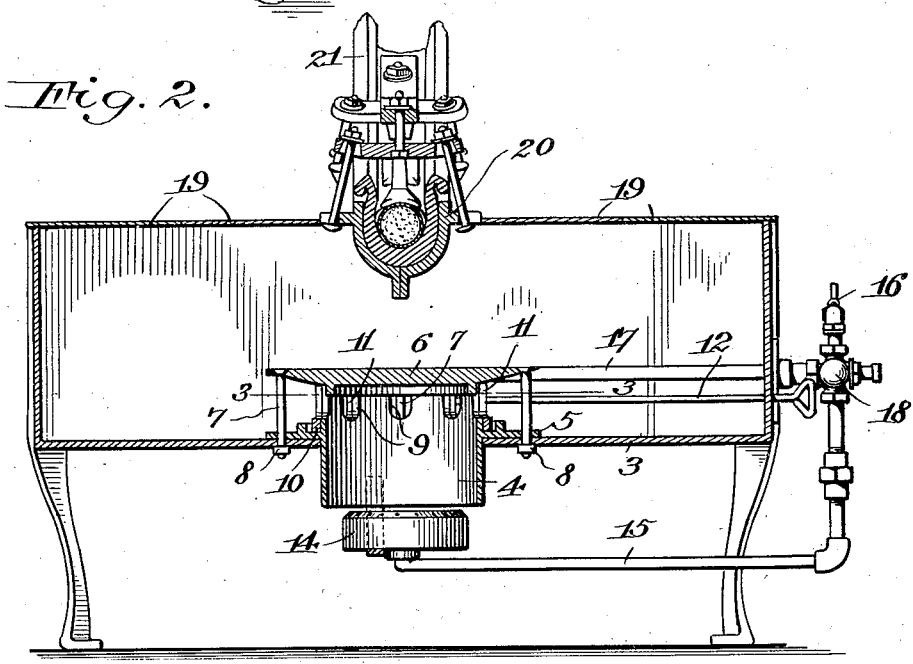
WITNESSES:
INVENTOR,
Emil Nestler.
BY
ATTORNEYS.

Patented Mar. 16, 1926.

1,577,291

UNITED STATES PATENT OFFICE.

EMIL NESTLER, OF NEW YORK, N. Y., ASSIGNOR TO NESTLER RUBBER FUSING CO., INC., OF NEW YORK, N. Y., A CORPORATION OF NEW YORK.

DRY-HEAT CURING CABINET.

Application filed December 4, 1924. Serial No. 753,978.

*To all whom it may concern:*

Be it known that I, EMIL NESTLER, a citizen of Germany, and a resident of the city of New York, borough of Manhattan, in the county and State of New York, have invented a new and Improved Dry-Heat Curing Cabinet, of which the following is a full, clear, and exact description.

This invention relates to dry heat curing cabinets, and more particularly to a heater utilizing dry heat in the fusing or vulcanizing operation of rubber, and more specifically in the retreading of shoes or tires.

A further object is to provide a heater or curing cabinet which is especially adapted for use in connection with molds forming the subject matter of an application Serial No. 753,977 and which dispenses altogether with the use of steam or moisture and in lieu thereof subjects the tires and molds containing them to a dry heat in carrying out my improved fusing or vulcanizing operation.

A further object is to provide a heater or cabinet of the character stated in which the draft of air or entrance of heated air can be varied and controlled in accordance with conditions so as to maintain a desired temperature, and in order that the device may be entirely automatic a thermostatic element may be employed to control the flow of fuel.

It is to be understood in connection with my improved cabinet or heater I may use a burner, such as an electric burner or one using gas, oil or any other liquid or gaseous fuel, and while I shall hereinafter refer to the fuel as gas I desire this to be understood as a term broadly employed to cover any fuel which may be conveniently used.

With these and other objects in view, the invention consists in certain novel features of construction and combinations and arrangements of parts which will be more fully hereinafter described and pointed out in the claims.

In the accompanying drawings—

Figure 1 is a perspective view of my improved cabinet or heater showing a single tire or shoe in the process of fusing or vulcanizing;

Figure 2 is a view in longitudinal section through the heater or cabinet;

Figure 3 is a view in horizontal section on the line 3—3 of Figure 2.

1 represents a casing, which may be of any desired size and shape and of any suitable material. This casing 1 is preferably supported on feet 2 and is provided in the center of its bottom 3 with an air inlet tube 4. This tube 4 may be of any suitable diameter sufficient to admit the desired quantity of heated air, and is preferably provided with a flange 5 located on the bottom 3, and a deflector plate 6 is located on the top of the air inlet tube 4 within the cabinet and secured to bottom 3 by means of bolts 7 which project through the flange 5 and are secured by nuts 8 located against the bottom 3.

The tube 4 projects into the cabinet 1 and above the bottom thereof a desired distance and is provided in its wall with a circular series of openings 9 through which the heated air passes into the cabinet. Around the outside of that portion of the tube 4 within the cabinet I locate a damper ring 10 which is formed with openings 11 corresponding in size and number to the openings 9 so that by turning this damper ring 10 the openings may be closed or partially closed to regulate the draft into the cabinet. This damper ring 10 is operated by any suitable means outside of the cabinet. A simple form of operating means is illustrated and comprises a rod 12 connected to a lug 13 on the ring 10.

Below the tube 4 and in line therewith I locate a burner 14 having a supply pipe 15 with a suitable valve 16 controlling the flow thereof. Furthermore, I may provide a thermostatic element 17 projecting into the cabinet and controlling a valve illustrated at 18 so that the temperature within the cabinet may be automatically governed.

I would call particular attention to the construction of the top of my improved cabinet. This top comprises a series of movable plates 19 which may be removed and replaced by a segmental mold 20 containing a tire or shoe 21. In other words, the plates 19 are of the same size as the supporting portion of the mold which is formed by the horizontal webs 22 so that as many molds may be located on top of the cabinet as desired, and the spaces unoccupied by molds can be covered by plates 19 so that the top is effectually closed in all cases when the device is in operation.

The burner 14 supplies the necessary heat for the air entering the tube 4 and this air passes through the openings 9 and 11 in the cabinet to give a dry heat of the desired temperature to the mold or molds and subject the rubber of the tires or shoes to the desired temperature for fusing or vulcanizing without employing moisture or steam.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A dry heat curing cabinet, comprising a casing having an opening in its bottom, a heat receiving tube fitting in the opening and projecting above and below the bottom of the casing, and means in the casing controlling the escape of heat from the tube into the casing.

2. An apparatus of the character described, comprising a casing, an air entrance tube projecting into the bottom of the casing, a deflector on the top of the tube larger in diameter than the tube, a damper ring around the tube in the casing, said ring and tube having registering openings therein, means for moving the ring relative to the tube to vary the sizes of the air inlets, and a burner discharging its heat into the bottom of the tube.

EMIL NESTLER.